(12) United States Patent
McDonald et al.

(10) Patent No.: US 8,215,282 B2
(45) Date of Patent: Jul. 10, 2012

(54) METHOD AND SYSTEM TO REDUCE ACCESSORY DRIVE BELT SLIP

(75) Inventors: Mike M. McDonald, Macomb, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 930 days.

(21) Appl. No.: 12/256,872

(22) Filed: Oct. 23, 2008

(65) Prior Publication Data

US 2010/0102783 A1 Apr. 29, 2010

(51) Int. Cl.
*F02B 67/06* (2006.01)
*H02P 9/04* (2006.01)

(52) U.S. Cl. .......... 123/198 R; 123/320; 290/40 R; 290/40 C; 322/23

(58) Field of Classification Search .......... 123/198 R, 123/320, 339.18, 343; 290/40 C, 40 R, 40 B; 322/23, 38, 44, 89
See application file for complete search history.

(56) References Cited

U.S. PATENT DOCUMENTS

| | | |
|---|---|---|
| 2,574,573 A | 11/1951 | Libby |
| 3,497,043 A | 2/1970 | Leonard |
| 4,304,107 A | 12/1981 | Fall et al. |
| 4,410,071 A | 10/1983 | Osterman |
| 4,437,358 A | 3/1984 | Kubo et al. |
| 4,458,720 A | 7/1984 | Gierer |
| 4,509,389 A | 4/1985 | Vahratian et al. |
| 4,662,488 A | 5/1987 | Hiramatsu et al. |
| 4,890,707 A | 1/1990 | Suzuki |
| 4,951,788 A | 8/1990 | Martin |
| 4,998,604 A | 3/1991 | Vukovich et al. |
| 5,086,894 A | 2/1992 | Iizuka et al. |
| 5,129,493 A | 7/1992 | Edmunds |
| 5,421,302 A | 6/1995 | Livshits et al. |
| 5,577,474 A | 11/1996 | Livshiz et al. |
| 5,637,987 A | 6/1997 | Fattic et al. |
| 5,698,905 A | 12/1997 | Ruthlein et al. |
| 5,701,982 A | 12/1997 | Nakatani et al. |
| 5,726,892 A | 3/1998 | Tang et al. |
| 5,789,823 A | 8/1998 | Sherman |
| 5,802,490 A | 9/1998 | Droste |
| 6,174,254 B1 * | 1/2001 | Tsai ................. 474/69 |
| 6,254,507 B1 | 7/2001 | Downs |
| 6,296,019 B1 | 10/2001 | Muller et al. |
| 6,394,248 B1 * | 5/2002 | Monahan et al. .......... 192/41 S |
| 6,695,111 B1 | 2/2004 | Bai |
| 6,757,603 B2 * | 6/2004 | Nozaki ................. 701/51 |
| 6,834,228 B2 * | 12/2004 | Serkh et al. ............. 701/115 |
| 6,998,823 B2 * | 2/2006 | Albertson ............... 322/38 |
| 7,019,414 B2 * | 3/2006 | Albertson et al. .......... 290/40 B |

(Continued)

FOREIGN PATENT DOCUMENTS

JP 10338059 A * 12/1998

*Primary Examiner* — Noah Kamen
*Assistant Examiner* — Grant Moubry

(57) ABSTRACT

A method and a system for reducing belt noise in an engine, wherein the belt is engaged with an alternator includes a transmission upshift detection module determining a transmission upshift or a quickly closing throttle detection module determining a quickly closing throttle. The control module further includes an engine speed prediction module determining a predicted engine speed in response to determining a transmission upshift and an engine deceleration prediction module determining a predicted engine deceleration when the predicted deceleration of the engine crankshaft is greater than a threshold. An alternator control module controls a rotor current in the alternator to add load to the alternator rotor to reduce potential belt noise.

19 Claims, 5 Drawing Sheets

U.S. PATENT DOCUMENTS

| | | | |
|---|---|---|---|
| 7,229,372 B2 * | 6/2007 | Shimanaka et al. | 474/28 |
| 7,389,176 B2 * | 6/2008 | Kadono et al. | 701/114 |
| 7,523,734 B2 * | 4/2009 | Albertson et al. | 123/192.1 |
| 7,573,219 B2 * | 8/2009 | Kees et al. | 318/432 |
| 7,678,016 B2 * | 3/2010 | Nakayama | 477/45 |
| 2006/0043939 A1 * | 3/2006 | Namuduri et al. | 322/23 |

* cited by examiner

METHOD AND SYSTEM TO REDUCE ACCESSORY DRIVE BELT SLIP

FIELD OF THE INVENTION

The present invention relates to internal combustion engines, and more particularly to reducing accessory drive belt slip by selectively damping alternator rotor angular momentum.

BACKGROUND OF THE INVENTION

An accessory drive belt for an engine is driven by the crankshaft and may be operatively connected by pulleys to an air pump, an air conditioning compressor, a water pump, a power steering pump, and an alternator for driving these devices. The pulley associated with the alternator is much smaller than the pulley associated with the crankshaft, so the alternator rotor rotates at a relatively high speed. Also, the alternator rotor has a relatively high inertia, which results in a high rotational momentum due to the high speed.

The speed profile of the crankshaft may vary significantly during engine cycles, particularly when the engine has a small number of active cylinders. Accordingly, due to the rotational momentum of the alternator rotor, significant positive or negative tension may occur in the belt between the crankshaft and the alternator as speed variations occur in the crankshaft. As a result of these tension variations in the belt, belt noise or belt chirp may occur. Other problems include vibration and reduced durability of the drive belt system.

Certain conditions within the vehicle exacerbate this problem. Also, continually checking for the certain conditions may unnecessarily increase the processing load of the control device.

SUMMARY OF THE INVENTION

The present disclosure provides a method for predicting when belt slip may occur and controlling the alternator during the predicted time periods.

In one aspect of the disclosure, a method of reducing belt noise in an engine, wherein the belt is engaged with an alternator includes determining a transmission upshift or a quickly closing throttle, determining a predicted crankshaft speed in response to determining a transmission upshift or a quickly closing throttle, determining a predicted crankshaft deceleration, when the predicted crankshaft deceleration of the crankshaft is greater than a threshold, controlling a rotor current in the alternator to damp said alternator's rotor momentum to reduce potential belt noise.

In another aspect of the disclosure, a control module for reducing belt noise in an engine, wherein the belt is engaged with an alternator includes a transmission upshift detection module determining a transmission upshift or a quickly closing throttle detection module determining a quickly closing throttle. The control module further includes an engine speed prediction module determining a predicted engine speed in response to determining a transmission upshift and an engine deceleration prediction module determining a predicted engine deceleration. An alternator control module controls a rotor current in the alternator to slow down the alternator to reduce potential belt noise.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
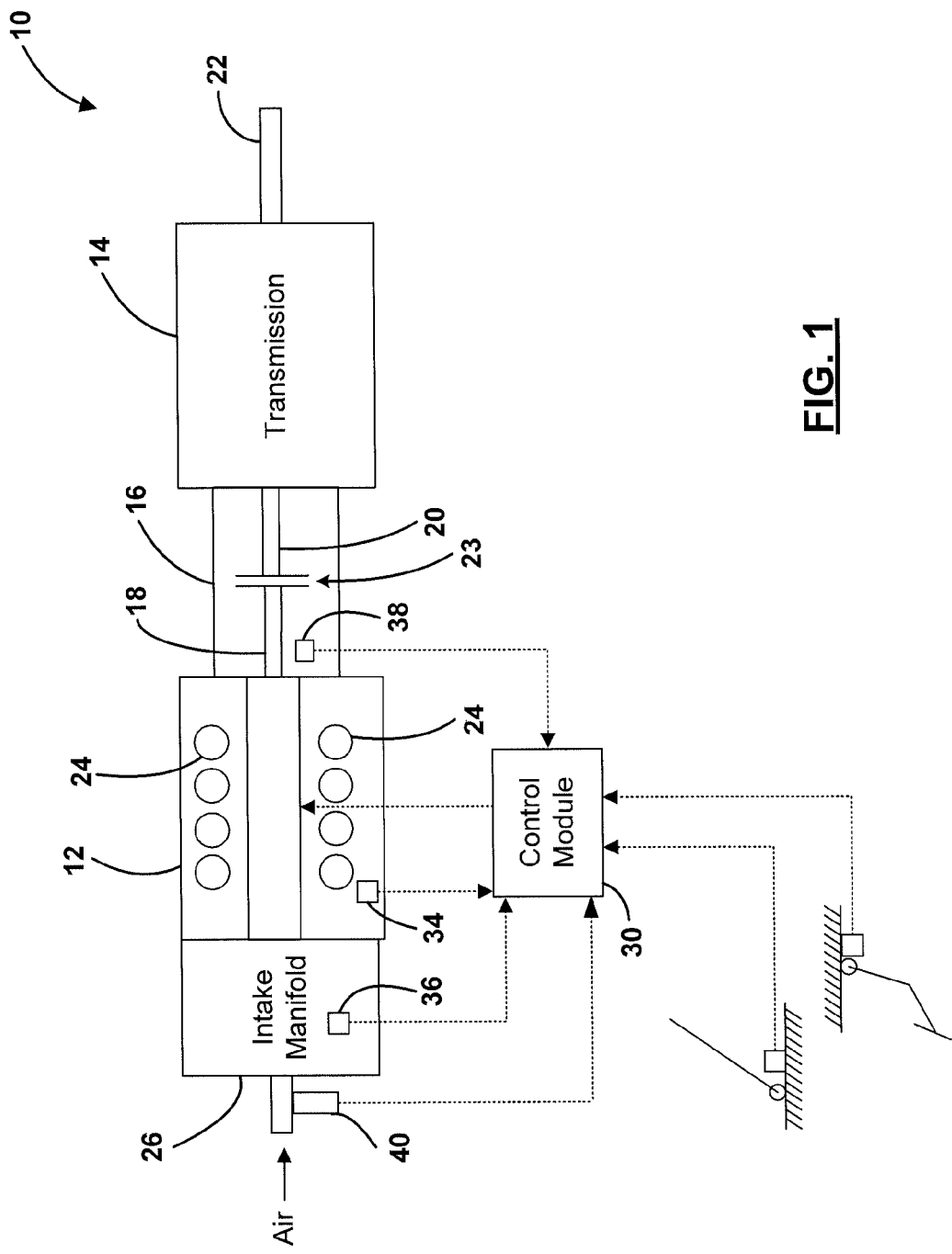
FIG. 1 is a functional block diagram illustrating an exemplary vehicle including an engine, a transmission, and a torque converter.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 includes an engine 12 that drives a transmission 14. The transmission 14 is an automatic transmission and is driven by the engine 12 through a corresponding torque converter 16. More specifically, the engine 12 generates drive torque to drive a crankshaft 18. The crankshaft 18 is selectively coupled to an input shaft 20 of the transmission 14 through the torque converter 16. The transmission 14 transfers the drive torque to drive an output shaft 22 that drives a drivetrain (not shown) to propel the vehicle 10.

The torque converter 16 provides a fluid coupling that enables the engine 12 to spin somewhat independently from the transmission 14. If the engine 12 is spinning slowly (e.g., at idle), the amount of drive torque transferred through the torque converter is very small. As the engine speed increases, the amount of drive torque transferred through the torque converter 16 generally increases. Although not illustrated, the torque converter includes a pump, a turbine, and a stator. The turbine drives the input shaft 20. The stator redirects the hydraulic fluid from the turbine to the pump. Exemplary torque converters are described in further detail in commonly assigned U.S. Pat. Nos. 6,254,507 and 6,695,111, issued on Jul. 3, 2001 and Feb. 24, 2004, respectively, the disclosures of which are expressly incorporated herein by reference in their entirety.

Initially, the pump and turbine spin at different rotational speeds. Eventually, the pump and turbine rotate at a common rotational speed. A converter clutch 23 selectively locks the pump and turbine for common rotation. More specifically, the converter clutch 23 is operated in an engaged state (i.e., coupling the pump and the turbine for common rotation) and a disengaged state (i.e., decoupling the pump and the turbine from common rotation). In some cases, slippage between the pump and the turbine is regulated to provide a desired torque transfer therebetween. When regulated, relative slippage (e.g., 40 rpm) between the pump and turbine is controlled and the torque converter efficiency can be improved.

Figure 2:
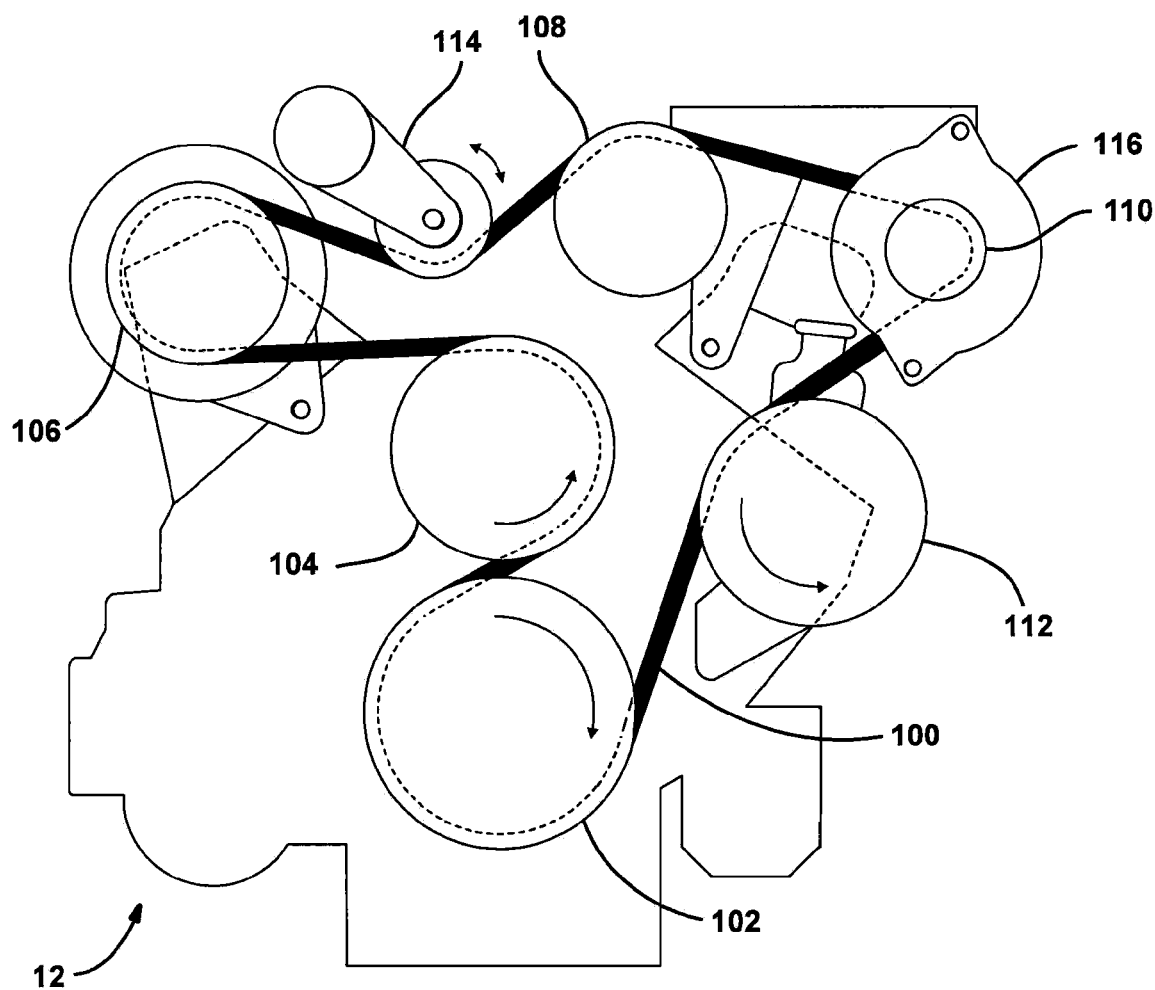
FIG. 2 is a schematic of an engine including a belt that drives vehicle accessories.

The engine 12 includes N cylinders 24. Although FIG. 2 depicts eight cylinders (N=8), it is appreciated that the engine 12 may include additional or fewer cylinders 24. For example, engines having 4, 5, 6, 8, 10, 12 and 16 cylinders are contemplated. Air flows into the engine 12 through an intake manifold 26 and is combusted with fuel in the cylinders 24.

A master control module 30 communicates with the engine 12 and various inputs and sensors as discussed herein. An engine speed sensor 34 generates an engine speed signal based on engine speed. A pressure (MAP) sensor 36 generates a MAP signal based on a pressure of the intake manifold 26. A crankshaft position sensor 38 generates a crankshaft position signal based on a crankshaft position and provides an indication of the rotational speed of the crankshaft. Engine load is determined based on the intake MAP, cylinder mode, and engine speed.

A throttle position sensor 40 generates a throttle position signal corresponding to the amount of opening of the throttle. Typically a throttle position sensor is resistive. A rate of throttle opening can be determined from the throttle position signal.

Referring now to FIG. 2, the engine 12 includes a belt 100 to drive various accessory systems. The belt 100 is driven by a crankshaft pulley 102 that is connected to the crankshaft 18. The belt 100 drives a water pump pulley 104, an air conditioner compressor pulley 106, an air pump pulley 108, an alternator pulley 110, and a power steering pump pulley 112. A spring loaded belt tensioner 114 is provided to maintain tension in the belt 100. The alternator pulley 110 is connected to an alternator 116. Typically the alternator 116 is driven by the belt 100 and is used to generate electricity for the vehicle 10. However, the alternator 116 may be used as a braking device to selectively reduce the rotational momentum of the alternator with a braking torque. When applying rotor current to the alternator 116, a magnetic torque is created, and the torque load on the alternator pulley 110 may be manipulated. By manipulating the torque load of the alternator pulley 110, the rotational speed variation between the crankshaft 18 and the alternator pulley 110 may be influenced during rapid changes in crankshaft speed.

Figure 3:
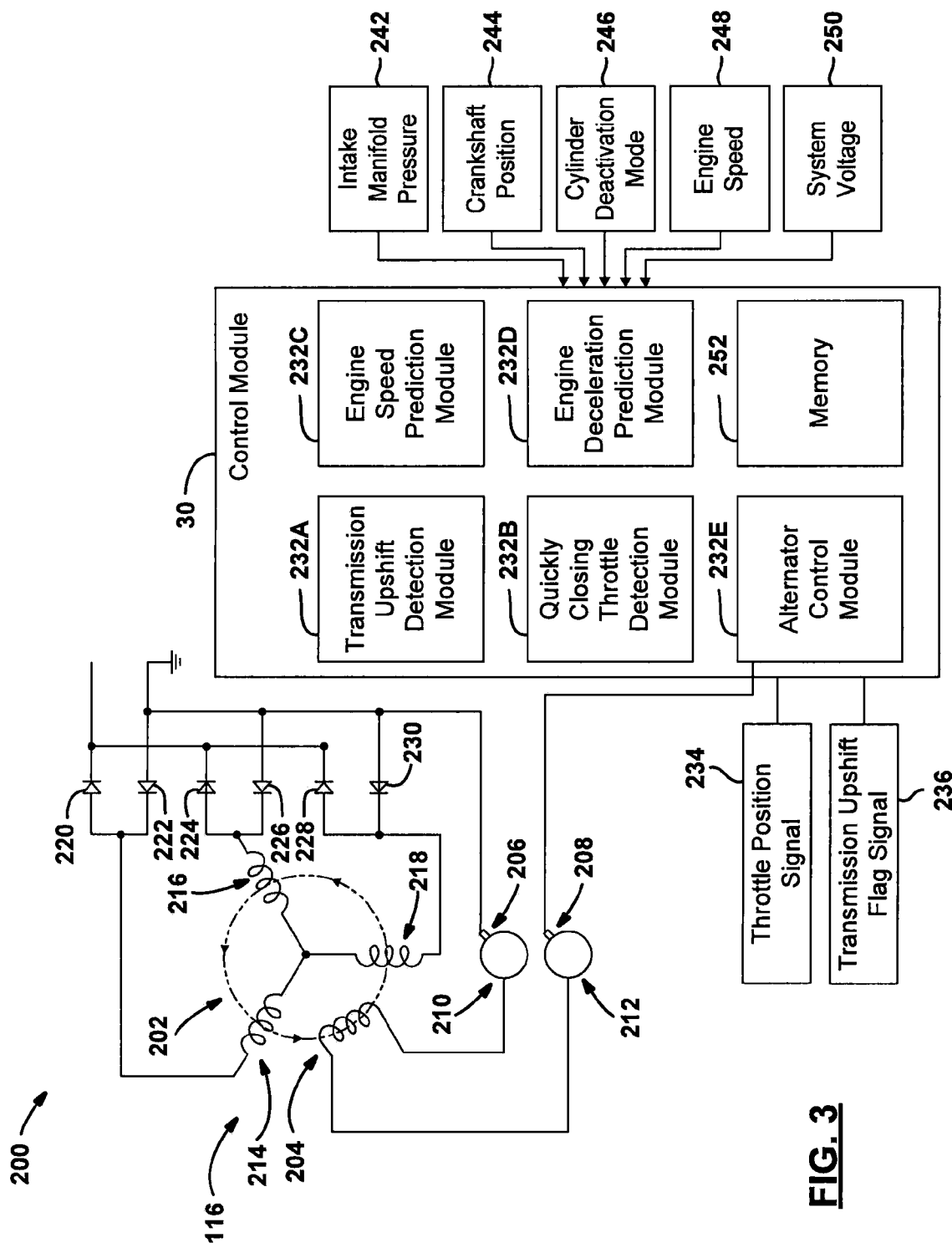
FIG. 3 is a functional block diagram illustrating a system that controls an alternator to reduce crankshaft rotational speed variations.

Referring now to FIG. 3, a system 200 is shown for reducing belt noise by controlling synchronization of the alternator pulley 110 and the belt 100 during rapid deceleration of the crankshaft. The system 200 uses the alternator current as an adjustable braking device at the alternator to reduce belt slippage at the alternator pulley 110. The alternator 116 includes a stator 202 and a rotor 204. A voltage is applied across the rotor 204 via brushes 206, 208 and slip rings 210, 212 causing current to flow through windings of the rotor 204. When the voltage is applied to the windings of the rotor 204, the rotor 204 acts as an electromagnet.

When the rotor 204 rotates, a magnetic field induces alternating current in stationary coils of the stator 202. The alternating current from zones 214, 216, and 218 of the stator is converted to direct current with diodes 220, 222, 224, 226, 228, and 230. The direct current is used to charge a battery (not shown) and to drive electrical systems of the vehicle 10.

The system 200 includes the master control module 30. The control module 30 determines operating parameters using various modules. The modules within the control module 30 may be incorporated into a module or distributed among several modules. A transmission upshift detection module 232A that determines when the transmission is entering an upshift. A transmission upshift flag signal 236 may be provided to the transmission upshift detection 232A. The transmission upshift flag signal 236 may originate from a transmission controller or the controller 30 illustrated in FIG. 1. A quickly closing throttle detection module 232B determines when the throttle is closing quickly. A throttle position signal 234 may be provided to the throttle detection module 232B. The throttle position signal 234 may originate from the throttle position sensor associated with the engine. A crankshaft speed prediction module 232C generates an engine speed prediction. The engine speed prediction module 232C may predict the engine speed and a time period associated with the engine speed changing. Various signals may include an intake manifold pressure signal 242, a crankshaft position signal 244, a cylinder deactivation mode 246, an engine speed signal 248, and a system voltage 250. Various methods for predicting the engine speed and engine torque are provided in various U.S. patents including U.S. Pat. Nos. 5,421,302, 5,577,474 and 5,726,892, the disclosures of which are incorporated by reference herein.

An engine deceleration prediction module 232D generates a prediction of the engine deceleration. The deceleration prediction module 232D may use the same signals as module 232C and the engine speed prediction signal generated therefrom in its deceleration prediction.

In response to the engine deceleration and engine speed prediction signals, an alternator control module 232E controls the rotor current in the alternator to add load to the alternator and reduce the potential for belt slip.

A memory 252 may also be associated with the alternator control module 232. The memory 252 may store various intermediate calculations as well as a table of time versus a predicted rotation per minute or crankshaft speed. Of course, the memory 252 may also be associated with the engine speed predictor module 232C.

Figure 4:
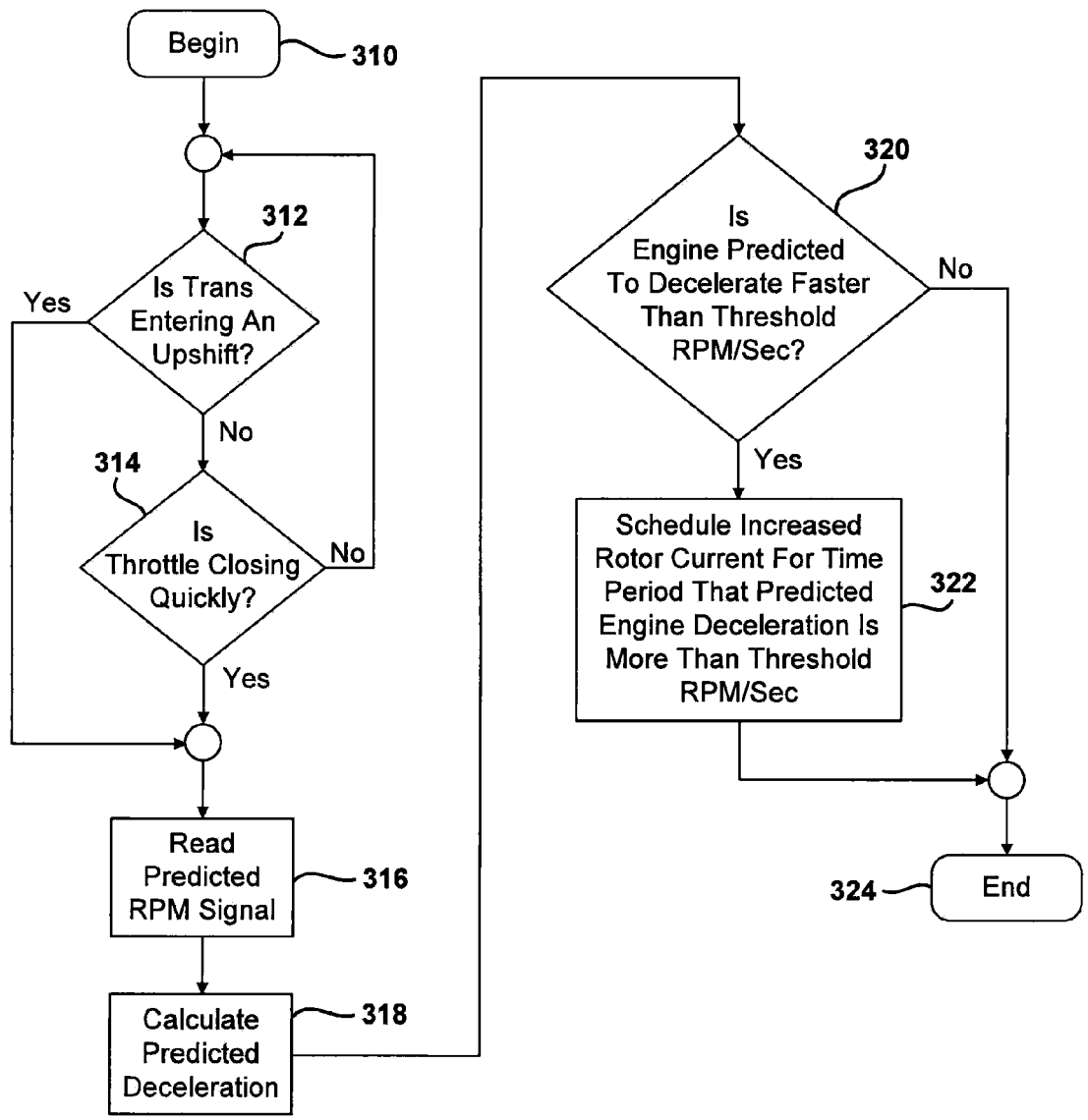
FIG. 4 is a flowchart of a method of the operating of the system.

Referring now to FIG. 4, a method of operating an alternator to reduce the potential for belt slippage is set forth. The process begins in block 310. After block 310, step 312 determines whether the transmission is entering an upshift. As mentioned above, an upshift flag may be generated by the transmission or controller associated with the transmission prior to an upshift. If the transmission is not entering an upshift, step 314 determines whether the throttle is closing quickly. To determine whether the throttle is closing quickly, the throttle position sensor may be analyzed over a predetermined amount of time. For example, the throttle position sensor signal may be differentiated or otherwise filtered to determine the rate of change associated therewith. The rate of change may be a slope of the throttle position sensor signal. If the throttle is not closing quickly, the system again performs step 312.

If step 312 indicates that the transmission is entering an upshift or in step 314 if the throttle is closing quickly, step 316 is performed. Thus, when either one of steps 312 or 314 are true, the rest of the process is initiated. By checking for these two parameters, continually processing the other calculations set forth below does not burden the controller.

In step 316, the predicted engine speed signal is read by the controller. The predicted RPM signal may be generated in various ways including looking at a torque/speed prediction algorithm. As mentioned above, various methods for predicting the engine speed or engine RPMs are known.

After step 316, a predicted deceleration of the engine speed based upon the predicted speed signal is calculated. This may be calculated in the alternator control module 232E illustrated in FIG. 3 or the engine speed predictor module 232C of FIG. 3. In step 320, the deceleration prediction is compared to a deceleration threshold. If the engine is predicted to decelerate faster than a deceleration threshold, step 322 is performed. The deceleration threshold may be set at a point that delineates belt slippage or belt squeal. Of course, this may depend on various factors, including the composition of the belt, the overall load of the engine and the amount of deceleration. Each engine for each model may have a different deceleration threshold. When the predicted deceleration is faster than the threshold, step 322 increases the rotor current for a predetermined amount of time that the deceleration is more than the threshold. The engine speed deceleration prediction module may predict both a deceleration and an amount of time of the deceleration. Transmission upshifts and quickly closing throttles are only active for a predetermined amount of time.

After step 322, the system ends in step 324.

Referring back to step 320, if the engine speed is not predicted to decelerate faster than the threshold, then there is a reduced likelihood of belt slippage or squeal. Therefore, after step 320, the system may also end in step 324.

In step 322, the current in the alternator rotor is increased. By increasing the current in the rotor, the additional current provides magnetic braking to the rotating alternator. The momentary increase in rotor current essentially converts a portion of the rotor rotational energy into electrical energy.

Figure 5:
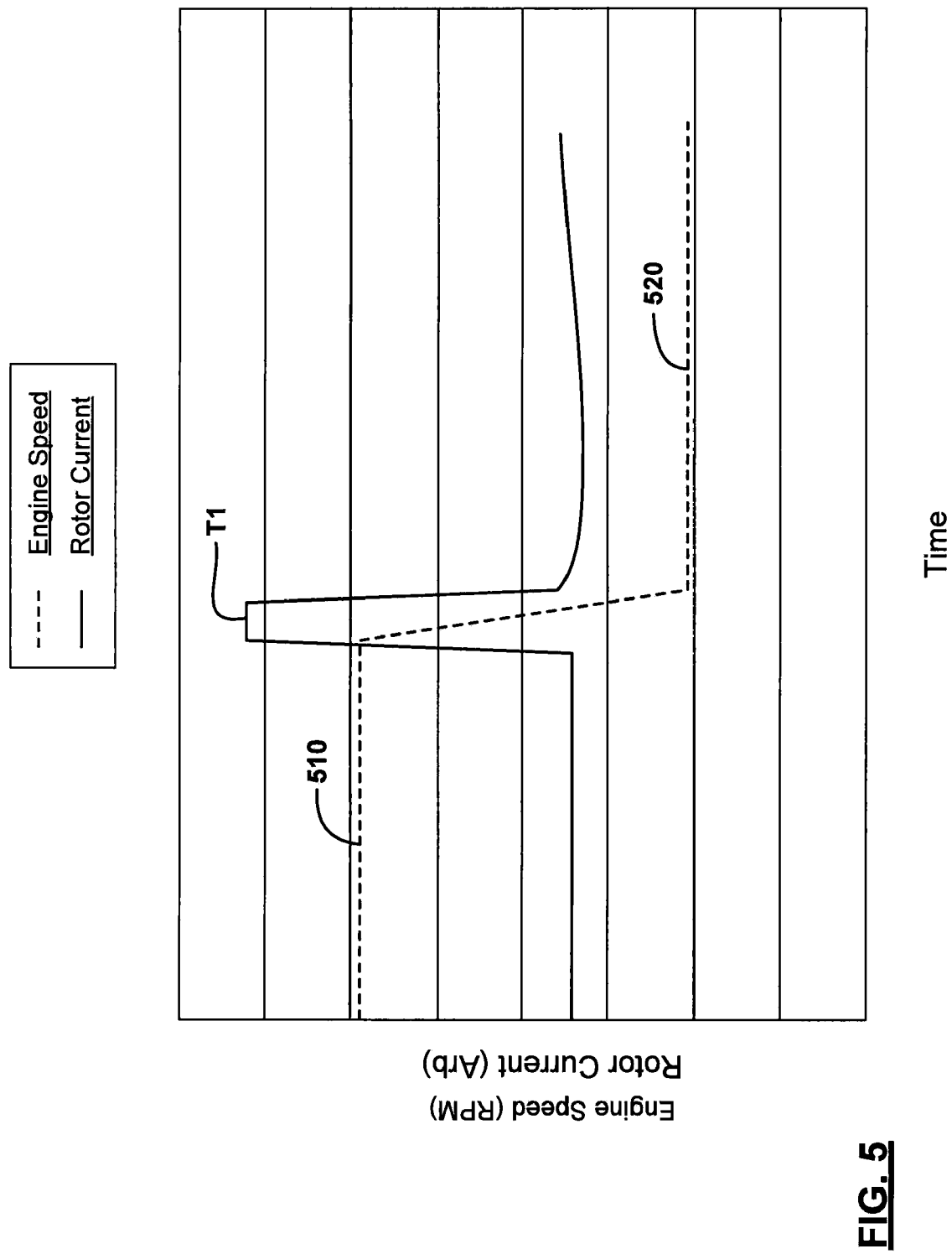
FIG. 5 is graphical illustration of commanded alternator rotor current versus time.

Referring now to FIG. 5, the engine speed is illustrated decelerating from a first speed level 510 (in RPMs) to a second speed level 520. This deceleration may be due to an upshift in the transmission or the throttle closing quickly. The rotor current is increased before the engine speed actually decreases. The rotor current reaches its peak about the same time the engine speed begins to decelerate. The time $T_1$ corresponding to the amount of time the rotor current is held at a peak position may vary depending on the predicted rate of deceleration. The amount of time is sufficient to reduce the alternator rotor rotational momentum to maintain belt synchronization between the alternator pulley 110 surface and the belt 100 surface and thus reduce the potential for belt squeal during deceleration. The rotor current is reduced to its normal level after the predetermined time $T_1$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of reducing belt noise in an engine, wherein the belt is engaged with an alternator pulley associated with a rotor, said method comprising:
   determining a transmission upshift or a quickly closing throttle;
   determining a predicted crankshaft speed in response to determining a transmission upshift or a quickly closing throttle;
   determining a predicted crankshaft deceleration; and
   when the predicted crankshaft deceleration of the crankshaft is greater than a threshold, controlling a rotor current in an alternator to damp a rotor momentum to reduce potential belt noise.

2. The method of claim 1 further comprising predicting a deceleration time period and wherein controlling a rotor current comprises controlling rotor current in the alternator for the deceleration time period.

3. The method of claim 2 wherein controlling a rotor current increases a braking torque applied to the rotor of the alternator.

4. The method of claim 2 wherein controlling a rotor current decreases a braking torque after said deceleration time period.

5. The method of claim 1 wherein determining a transmission upshift or a quickly closing throttle comprises determining a transmission upshift from an upshift flag.

6. The method of claim 1 wherein determining a transmission upshift or a quickly closing throttle comprises determining a quickly closing throttle from a throttle position sensor.

7. The method of claim 1 wherein controlling a rotor current comprises increasing a rotor current during an engine deceleration.

8. The method of claim 1 wherein controlling a rotor current comprises maintaining a peak rotor current for a predetermined amount of time.

9. A control module for reducing belt noise in an engine, wherein the belt is engaged with an alternator, the control module comprising:
   a transmission upshift detection module detecting a transmission upshift or a quickly closing throttle detection module detecting a quickly closing throttle;
   an engine speed prediction module determining a predicted engine speed in response to determining the transmission upshift or the quickly closing throttle;
   an engine deceleration prediction module determining a predicted engine deceleration based on the engine speed; and
   an alternator current control module controlling a rotor current in the alternator to reduce alternator rotor rotational momentum to reduce potential belt noise.

10. The control module of claim 9 wherein the engine deceleration prediction module predicts a deceleration time period and controls the rotor current in the alternator for the deceleration time period.

11. The control module of claim 10 wherein the alternator current control module increases said rotor current to increase a braking torque to maintain alternator pulley to belt synchronization.

12. The control module of claim 10 wherein the alternator current control module decreases the rotor current to reduce a braking torque after the time period.

13. The control module of claim 9 wherein the transmission upshift detection module determines the transmission upshift from an upshift flag.

14. The control module of claim 9 wherein the quickly closing throttle detection module determines the quickly closing throttle is determined from a throttle position sensor.

15. The control module of claim 9 wherein the alternator control module controls the rotor current during the predicted engine deceleration.

16. The control module of claim 9 wherein the alternator control module controls the rotor current by maintaining a peak rotor current for a predetermined amount of time.

17. A system comprising:
   an engine having an engine pulley;
   the alternator having an alternator pulley coupled to the engine;
   the belt engaged with the alternator pulley and the engine pulley; and
   the control module of claim 9.

18. A system as recited in claim 17 further comprising a throttle position sensor communicating a throttle position signal to the control module.

19. A system as recited in claim 17 further comprising an engine speed sensor communicating an engine speed signal to the control module.

* * * * *